(12) United States Patent
Lin et al.

(10) Patent No.: US 9,966,860 B2
(45) Date of Patent: May 8, 2018

(54) SYSTEMS AND METHODS FOR REDUCING STANDBY POWER CONSUMPTION OF SWITCH-MODE POWER CONVERTERS

(71) Applicant: ON-BRIGHT ELECTRONICS (SHANGHAI) CO., LTD., Shanghai (CN)

(72) Inventors: Yingchieh Lin, Hsin-Tien (TW); Bo Li, Shanghai (CN); Lieyi Fang, Shanghai (CN)

(73) Assignee: ON-BRIGHT ELECTRONICS (SHANGHAI) CO., LTD., Shanghai (CN)

( * ) Notice: Subject to any disclaimer, the term of this patent is extended or adjusted under 35 U.S.C. 154(b) by 0 days. days.

(21) Appl. No.: 14/520,759

(22) Filed: Oct. 22, 2014

(65) Prior Publication Data

US 2015/0036393 A1 Feb. 5, 2015

Related U.S. Application Data

(63) Continuation of application No. 12/892,580, filed on Sep. 28, 2010, now Pat. No. 8,897,037.

(30) Foreign Application Priority Data

Aug. 23, 2010 (CN) .......................... 2010 1 0267539

(51) Int. Cl.
*H02M 3/335* (2006.01)
*H02M 1/00* (2006.01)

(52) U.S. Cl.
CPC ... *H02M 3/33515* (2013.01); *H02M 3/33507* (2013.01); *H02M 2001/0032* (2013.01); *Y02B 70/16* (2013.01)

(58) Field of Classification Search
CPC ......... H02M 3/33507; H02M 3/33523; H02M 2001/0032; H02M 1/32; H02M 1/4225;
(Continued)

(56) References Cited

U.S. PATENT DOCUMENTS 5,115,185 A * 5/1992 Fraidlin .............. H02M 1/4258
323/207
5,986,906 A 11/1999 Ramezani et al.
(Continued)

FOREIGN PATENT DOCUMENTS

CN 1404207 A 3/2003
CN 1581663 A 2/2005
(Continued)

OTHER PUBLICATIONS

United States Patent and Trademark Office, Notice of Allowance dated Jan. 13, 2016, in U.S. Appl. No. 13/367,097.
(Continued)

*Primary Examiner* — Henry Lee, III
(74) *Attorney, Agent, or Firm* — Faegre Baker Daniels LLP

(57) ABSTRACT

Power conversion system and method. The system includes a first capacitor including a first capacitor terminal and a second capacitor terminal, a second capacitor including a third capacitor terminal and a fourth capacitor terminal, and a plurality of diodes including a first diode, a second diode, a third diode, and a fourth diode. The first diode is coupled to the second diode at a first node, the second diode is coupled to the fourth diode at a second node, the fourth diode is coupled to the third diode at a third node, and the third diode is coupled to the first diode at a fourth node. Additionally, the system includes a fifth diode including a first anode and a first cathode and a sixth diode including a second anode and a second cathode.

14 Claims, 7 Drawing Sheets

(58) Field of Classification Search
CPC .... H02M 1/4258; Y02B 70/126; Y02B 70/16; Y02B 20/346; Y02B 70/1491
USPC ........ 363/21.12–21.13, 21.15–21.17, 49, 84, 363/125
See application file for complete search history.

(56) References Cited

U.S. PATENT DOCUMENTS

| | | | |
|---|---|---|---|
| 7,009,853 | B2 | 3/2006 | Nagel et al. |
| 7,492,614 | B2 | 2/2009 | Furukoshi et al. |
| 7,583,522 | B2 | 9/2009 | Hall et al. |
| 8,897,037 | B2 | 11/2014 | Lin et al. |
| 2005/0226014 | A1* | 10/2005 | Chang ................. H02M 7/1623 363/84 |
| 2005/0248968 | A1* | 11/2005 | Chang ................. H02M 1/4225 363/125 |
| 2007/0247879 | A1 | 10/2007 | Yang |
| 2008/0278969 | A1 | 11/2008 | Bolz et al. |
| 2011/0127935 | A1 | 6/2011 | Gao |
| 2012/0044723 | A1 | 2/2012 | Lin et al. |
| 2013/0033236 | A1 | 2/2013 | Li et al. |
| 2016/0329727 | A1 | 11/2016 | Li et al. |

FOREIGN PATENT DOCUMENTS

| | | |
|---|---|---|
| CN | 101714831 A | 5/2010 |
| JP | 2005-253284 A | 9/2005 |
| TW | 200537793 A | 11/2005 |

OTHER PUBLICATIONS

China Intellectual Property Office, Office Action dated Aug. 2, 2013, in China Patent Application No. 201010267539.5.
Taiwan Intellectual Property Office, Office Action dated Mar. 18, 2013, in related Taiwan Patent Application No. 099131847.
United States Patent and Trademark Office, Office Action dated Sep. 20, 2016, in U.S. Appl. No. 15/089,231.
United States Patent and Trademark Office, Office Action dated Jun. 15, 2017, in U.S. Appl. No. 15/089,231.
United States Patent and Trademark Office, Notice of Allowance dated Oct. 19, 2017, in U.S. Appl. No. 15/089,231.
United States Patent and Trademark Office, Office Action dated May 7, 2015, in U.S. Appl. No. 13/367,097.
United States Patent and Trademark Office, Office Action dated Jan. 25, 2018, in U.S. Appl. No. 15/835,232, 11 pages.

* cited by examiner

US 9,966,860 B2

SYSTEMS AND METHODS FOR REDUCING STANDBY POWER CONSUMPTION OF SWITCH-MODE POWER CONVERTERS

1. CROSS-REFERENCES TO RELATED APPLICATIONS

This application is a continuation of U.S. patent application Ser. No. 12/892,580, filed Sep. 28, 2010, which claims priority to Chinese Patent Application No. 201010267539.5, filed Aug. 23, 2010, commonly assigned, both of the above-referenced applications being incorporated by reference herein for all purposes.

2. BACKGROUND OF THE INVENTION

The present invention is directed to integrated circuits. More particularly, the invention provides systems and methods for reducing power consumption under light or no load conditions. Merely by way of example, the invention has been applied to a switch mode power converter under standby conditions. But it would be recognized that the invention has a much broader range of applicability.

Power converters have been widely used for consumer electronics such as portable devices. The power converters can convert electric power from one form to another. As an example, the electric power is transformed from alternate current (AC) to direct current (DC), from DC to AC, from AC to AC, or from DC to DC. Additionally, the power converters can also convert the electric power from one voltage level to another voltage level. Specifically, the power converters include linear converters and switch-mode converters. The switch-mode converters often use pulse-width-modulated (PWM) or pulse-frequency-modulated (PFM) mechanisms. The switch-mode converters usually are more efficient than the linear converters.

The power converters often must meet various international standards concerning energy savings, such as the Energy Star requirements and the Blue Angel requirements. Hence, the power converters usually need to have low power consumption and high power efficiency under light or no load conditions, such as under standby, suspended, or some other idle conditions.

FIG. 1 is a simplified conventional diagram showing a switch-mode power converter system with X-resistor and X-capacitor. The switch-mode power converter system 100 includes an X-resistor 110, an X-capacitor 120, input terminals 122 and 124, a switch-mode controller 130, diodes 152, 154, 156, and 158, a capacitor 160, a primary winding 172, a secondary winding 174, an auxiliary winding 176, and a switch 180. For example, the switch-mode controller 130 includes terminals 132, 134, 136, 138, and 139. In another example, the terminals 132, 134, 136, 138, and 139 are respectively the GND pin, the FB pin, the VCC pin, the GATE pin, and the CS pin.

To reduce power consumption of the converter system 100 under standby conditions, it often is important to lower the power consumption of the switch-mode controller 130. Additionally, the converter system 100 also includes other components, whose power consumption under standby conditions can become more significant as the power consumption of the switch-mode controller 130 is reduced. Therefore, the power consumption of these other components also need to be lowered in order to further reduce the power consumption of the switch-mode power converter system 100.

As shown in FIG. 1, the switch-mode power converter system 100 includes the X-capacitor 120 that is connected to the input terminals 122 and 124. The X-capacitor 120 often is used to address the issue of electromagnetic interference (EMI). But to maintain safety of the power converter system 100, the X-capacitor 120 needs to be discharged quickly so that the voltage across the X-capacitor 120 can drop below a predetermined threshold within 1 second after the input terminals 122 and 124 are disconnected from an AC power supply. To facilitate the discharge of the X-capacitor 120, the power converter system 100 also includes the X-resistor 110 that is connected to the X-capacitor 120 in parallel. But the X-resistor 110 would increase the power consumption of the power converter system 100 under standby conditions.

Hence it is highly desirable to improve the techniques of lowering power consumption under standby conditions.

3. BRIEF SUMMARY OF THE INVENTION

The present invention is directed to integrated circuits. More particularly, the invention provides systems and methods for reducing power consumption under light or no load conditions. Merely by way of example, the invention has been applied to a switch mode power converter under standby conditions. But it would be recognized that the invention has a much broader range of applicability.

According to one embodiment, a power conversion system includes a first capacitor including a first capacitor terminal and a second capacitor terminal, a second capacitor including a third capacitor terminal and a fourth capacitor terminal, and a plurality of diodes including a first diode, a second diode, a third diode, and a fourth diode. The first diode is coupled to the second diode at a first node, the second diode is coupled to the fourth diode at a second node, the fourth diode is coupled to the third diode at a third node, and the third diode is coupled to the first diode at a fourth node. Additionally, the system includes a fifth diode including a first anode and a first cathode and a sixth diode including a second anode and a second cathode. The first anode is connected to a first input terminal, the second anode is connected to a second input terminal, and the first cathode and the second cathode are connected to a fifth node. Moreover, the system includes a system controller including a first controller terminal, a second controller terminal, a third controller terminal, a fourth controller terminal, and a fifth controller terminal. Also, the system includes a primary winding including a first winding terminal and a second winding terminal, a secondary winding coupled to the primary winding, and an auxiliary winding coupled to the secondary winding. Additionally, the system includes a switch including a first switch terminal and a second switch terminal. The first node is connected to the first input terminal, the second node is connected to the first winding terminal, the third node is connected to the second input terminal, the fourth node is biased to a predetermined voltage, and the fifth node is connected to the first controller terminal. The second controller terminal is connected to the second input terminal, the third controller terminal is biased to the predetermined voltage, the fourth controller terminal is connected to the third capacitor terminal. The fourth capacitor terminal is biased to the predetermined voltage, the first capacitor terminal is connected to the first input terminal, and the second capacitor terminal is connected to the second input terminal. The first switch terminal is connected to the fifth controller terminal, and the second switch terminal is connected to the second winding terminal. The first input terminal and the second input terminal are configured to receive an input voltage, and the secondary winding is configured to generate an output voltage based on at least information associated with the input voltage.

According to another embodiment, a system for discharging a capacitor of a power conversion system includes a first capacitor including a first capacitor terminal and a second capacitor terminal. The first capacitor terminal is connected to a first input terminal, and the second capacitor terminal is connected to a second input terminal. Additionally, the system includes a second capacitor including a third capacitor terminal and a fourth capacitor terminal, the fourth capacitor terminal being biased to a predetermined voltage. Moreover, the system includes a first diode including a first anode and a first cathode, and a second diode including a second anode and a second cathode. The first anode is connected to the first input terminal, and the second anode is connected to the second input terminal. Also, the system includes a system controller including a first controller terminal, a second controller terminal, a third controller terminal, and a fourth controller terminal. The first controller terminal is connected to the first cathode and the second cathode, the second controller terminal is connected to the second input terminal, the third controller terminal is biased to the predetermined voltage, and the fourth controller terminal is connected to the third capacitor terminal. The system controller further includes a detection component a transistor, and an under-voltage-lockout component. The detection component is configured to receive a first input voltage from the second input terminal through the second controller terminal, receive a first signal from the under-voltage-lockout component, generate a second signal based on at least information associated with the first input voltage and the first signal, and send the second signal to the first transistor. The second signal is at a logic high level if the first input voltage is lower than a first threshold voltage in magnitude and the first signal is at the logic high level. The transistor includes a first transistor terminal, a second transistor terminal, and a third transistor terminal. The first transistor terminal is configured to receive the second signal from the detection component, and the second transistor terminal is connected to the third controller terminal. The under-voltage-lockout component is configured to receive a second input voltage from the third capacitor terminal through the fourth controller terminal and generate the first signal based on at least information associated with the second input voltage. The second signal is at the logic high level if the second input voltage is higher than a second threshold voltage in magnitude.

According to yet another embodiment, a system for discharging a capacitor of a power conversion system includes a first controller terminal. The first controller terminal is configured to receive a discharging current from a first diode or a second diode. The first diode and the second diode are coupled to a first capacitor, and the first capacitor is configured to be charged by a first input terminal and a second input terminal. Additionally, the system includes a second controller terminal configured to receive a first input voltage from the second input terminal, a third controller terminal biased to a predetermined voltage, and a fourth controller terminal configured to receive a second input voltage from a second capacitor. Moreover, the system includes a detection component. The detection component is configured to receive the first input voltage from the second input terminal through the second controller terminal, receive a first signal from an under-voltage-lockout component, generate a second signal based on at least information associated with the first input voltage and the first signal, and send the second signal to a transistor. The second signal is at a logic high level if the first input voltage is lower than a first threshold voltage in magnitude and the first signal is at the logic high level. Also, the system includes the transistor including a first transistor terminal, a second transistor terminal, and a third transistor terminal. The first transistor terminal is configured to receive the second signal from the detection component, and the second transistor terminal is connected to the third controller terminal. Additionally, the system includes the under-voltage-lockout component. The under-voltage-lockout component is configured to receive the second input voltage from the second capacitor through the fourth controller terminal and generate the first signal based on at least information associated with the second input voltage. The second signal is at the logic high level if the second input voltage is higher than a second threshold voltage in magnitude.

Many benefits are achieved by way of the present invention over conventional techniques. Certain embodiments of the present invention reduce standby power consumption of PWM-controlled switch-mode power converters, such as offline fly-back converters and/or forward converters.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

Figure 3A:
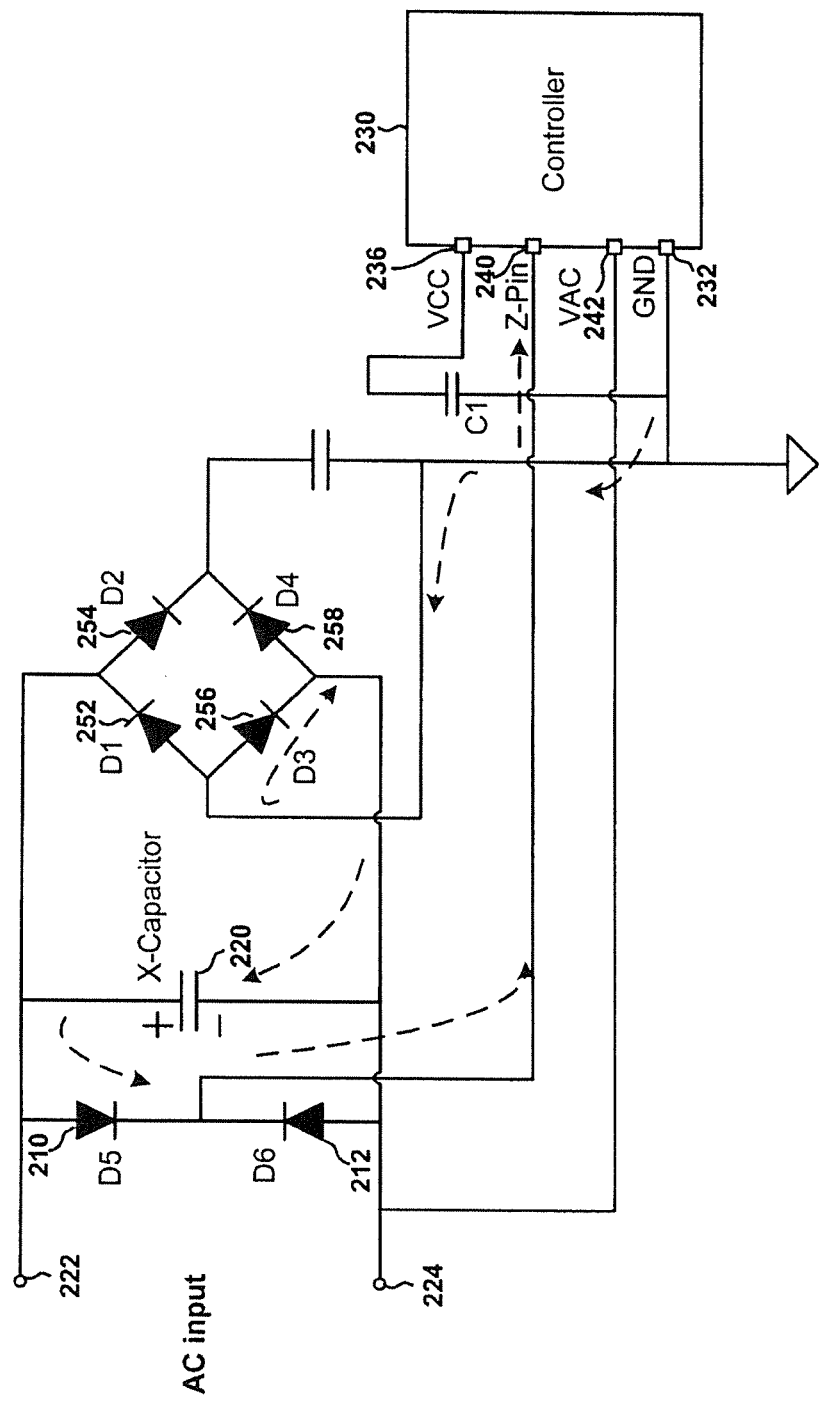

FIGS. 3(A) and (B) are simplified diagrams showing discharging the X-capacitor in the switch-mode power converter system according to certain embodiments of the present invention.

Figure 4:
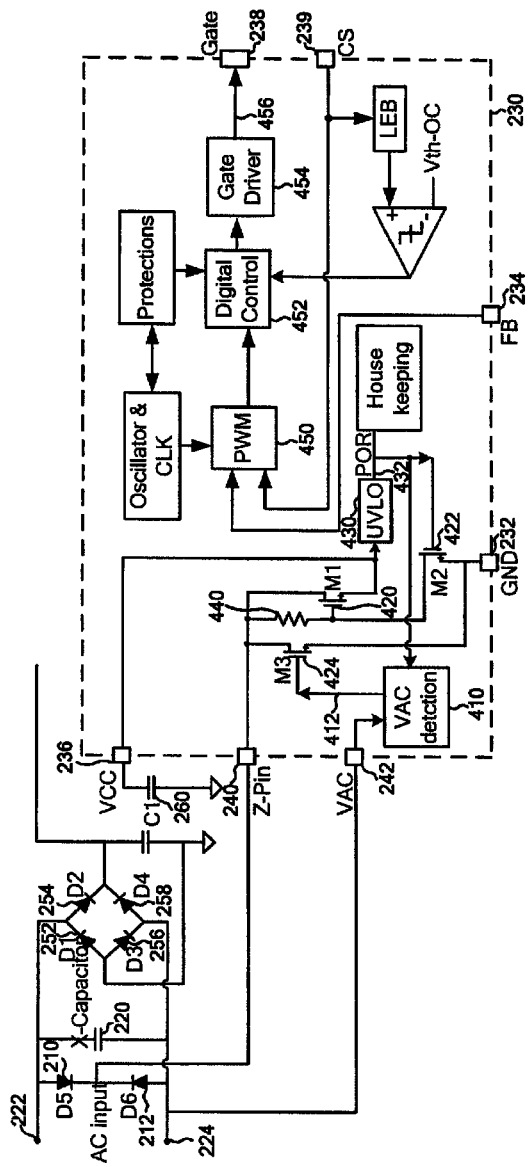

FIG. 4 is a simplified diagram showing the switch-mode controller in the switch-mode power converter system according to an embodiment of the present invention.

Figure 5:
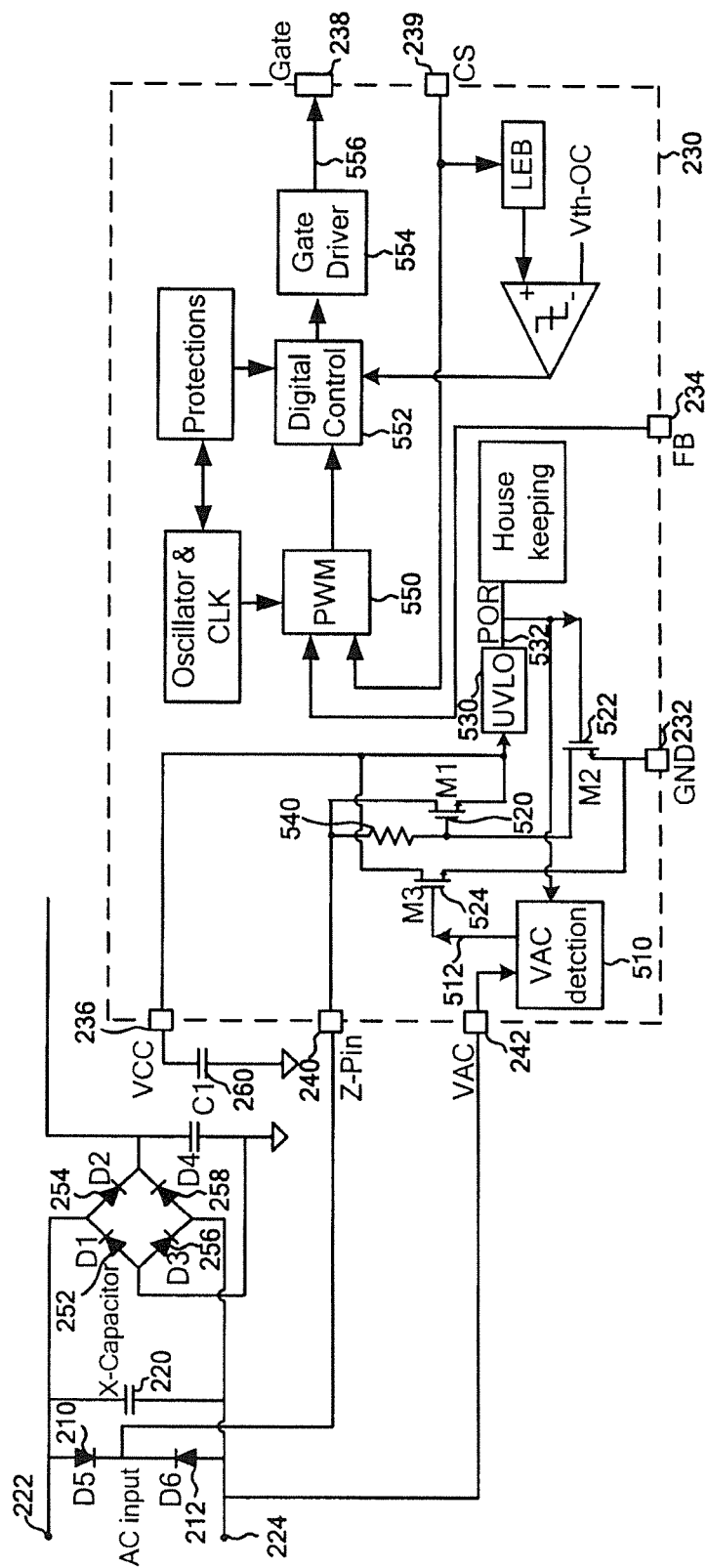

FIG. 5 is a simplified diagram showing the switch-mode controller in the switch-mode power converter system according to another embodiment of the present invention.

Figure 6:
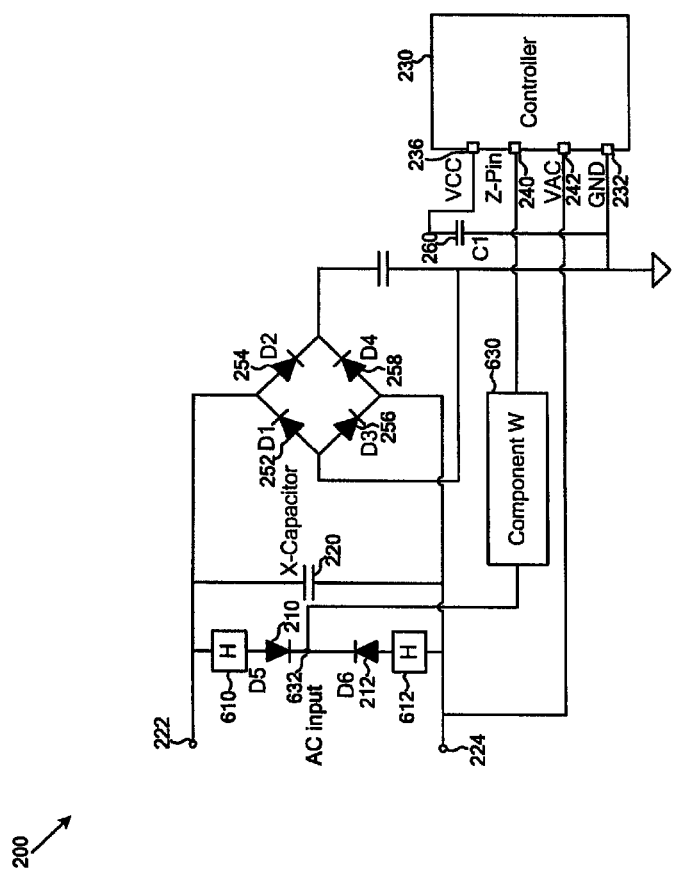

FIG. 6 is a simplified diagram showing the switch-mode power converter system according to another embodiment of the present invention.

5. DETAILED DESCRIPTION OF THE INVENTION

The present invention is directed to integrated circuits. More particularly, the invention provides systems and methods for reducing power consumption under light or no load conditions. Merely by way of example, the invention has been applied to a switch mode power converter under standby conditions. But it would be recognized that the invention has a much broader range of applicability.

Figure 1:
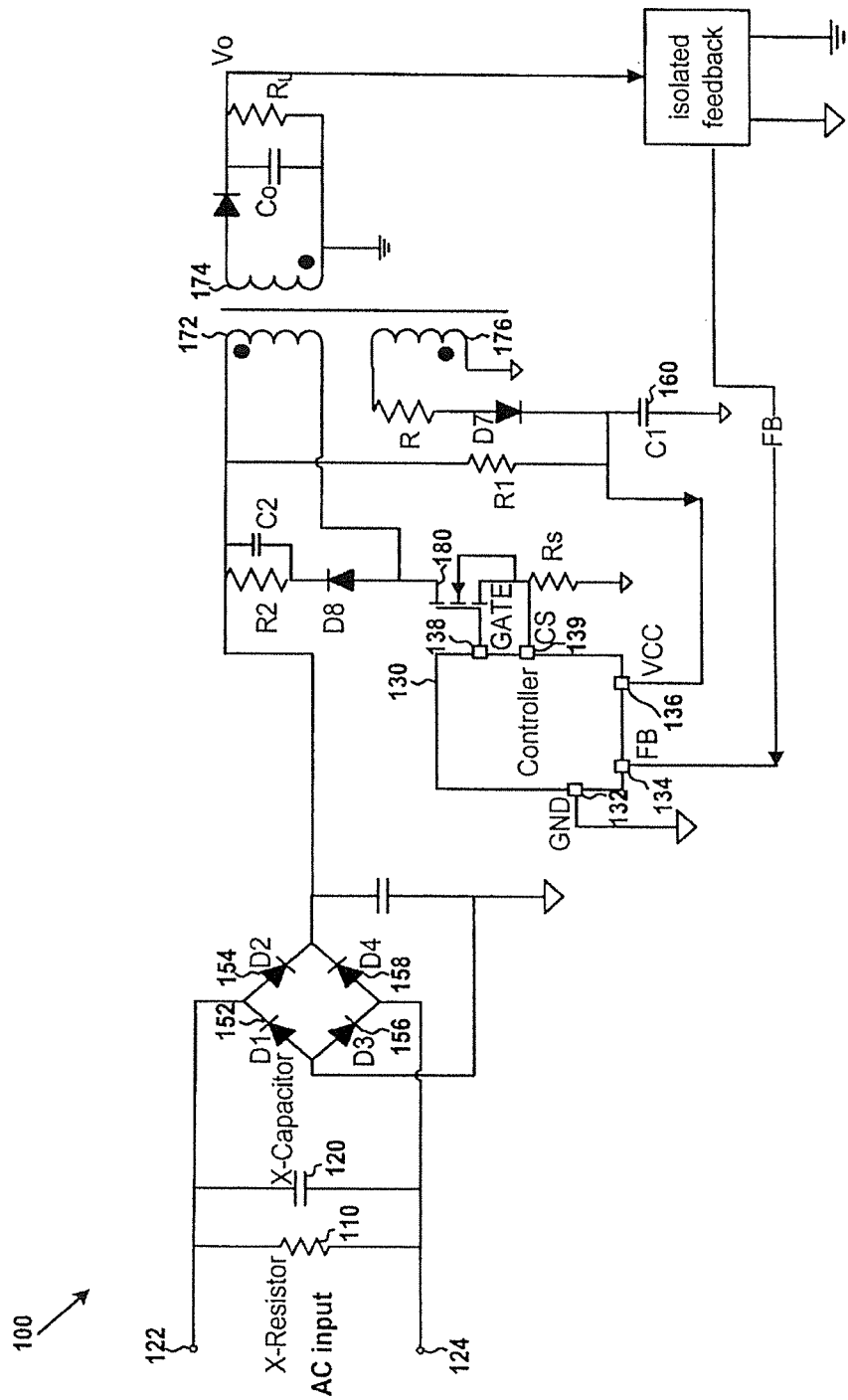
FIG. 1 is a simplified conventional diagram showing a switch-mode power converter system with X-resistor and X-capacitor.

Referring to FIG. 1, after the input terminals 122 and 124 are unplugged from the AC power supply, the charges accumulated on the X-capacitor 120 are released through the X-resistor 110. Therefore the voltage across the X-capacitor 120 should decrease with time as follows.

$$V_{xc}(t) = V_0 \times e^{-\left(\frac{t}{R_x C_x}\right)} \quad \text{(Equation 1)}$$

where $V_{xc}$ is the voltage across the X-capacitor 120, and $V_0$ is the voltage value of $V_{xc}$ at the time when the input terminals 122 and 124 are disconnected from the AC power supply. $R_x$ and $C_x$ are the resistance value and the capacitance value of the X-resistor 110 and the X-capacitor 120 respectively.

In order for $V_{xc}$ to drop approximately by a factor of e within 1 second, $$R_x \approx \frac{1}{C_x} \quad \text{(Equation 2)}$$

Usually, the magnitude of $C_x$ depends on the power of the switch-mode power converter system 100 and the solution to electromagnetic interference. If the capacitance of the X-capacitor 120 is increased, the resistance of the X-resistor 110 would become smaller according to Equation 2. Consequently, the power consumption by the X-resistor 110 also increases under the standby conditions, even though the X-resistor 110 often is useful for discharging the X-capacitor 120 after the terminals 122 and 124 are disconnected from the AC power supply.

Hence, to reduce power consumption of the switch-mode power converter system 100, it is desirable to disconnect the X-resistor 110 under the standby conditions or simply avoid using the X-resistor 110 for discharging the X-capacitor 120.

Figure 2:
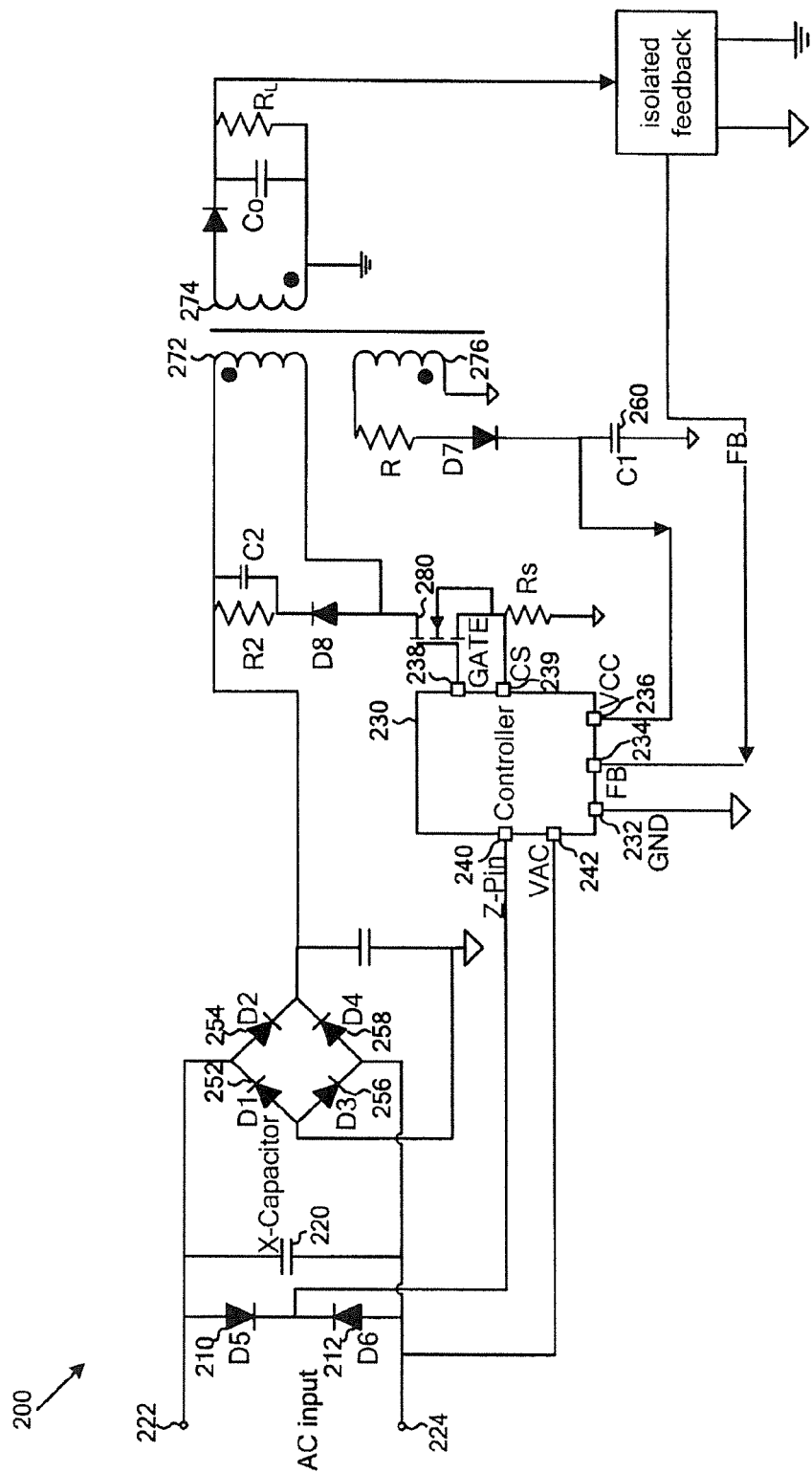
FIG. 2 is a simplified diagram showing a switch-mode power converter system according to an embodiment of the present invention.

FIG. 2 is a simplified diagram showing a switch-mode power converter system according to an embodiment of the present invention. This diagram is merely an example, which should not unduly limit the scope of the claims. One of ordinary skill in the art would recognize many variations, alternatives, and modifications.

As shown in FIG. 2, the switch-mode power converter system 200 includes diodes 210 and 212, an X-capacitor 220, input terminals 222 and 224, a switch-mode controller 230, diodes 252, 254, 256, and 258, a capacitor 260, a primary winding 272, a secondary winding 274, an auxiliary winding 276, and a switch 280. For example, the switch-mode controller 230 includes terminals 232, 234, 236, 238, 239, 240, and 242. In another example, the terminals 232, 234, 236, 238, 239, 240, and 242 are respectively the GND pin, the FB pin, the VCC pin, the GATE pin, the CS pin, the Z pin, and the VAC pin. In yet another example, the terminal 232 is biased to the ground.

FIGS. 3(A) and (B) are simplified diagrams showing discharging the X-capacitor 220 in the switch-mode power converter system 200 according to certain embodiments of the present invention. These diagrams are merely examples, which should not unduly limit the scope of the claims. One of ordinary skill in the art would recognize many variations, alternatives, and modifications.

As shown in FIG. 3(A), the input terminals 222 and 224 are disconnected from the AC power supply during the positive half period of the AC input according to one embodiment. After the disconnect, the positive charges accumulated on the X-capacitor 220 is released by flowing from one terminal to another terminal. For example, the positive charges flow through the diode 210, the terminal 240, the terminal 232, and the diode 256.

Figure 3B:
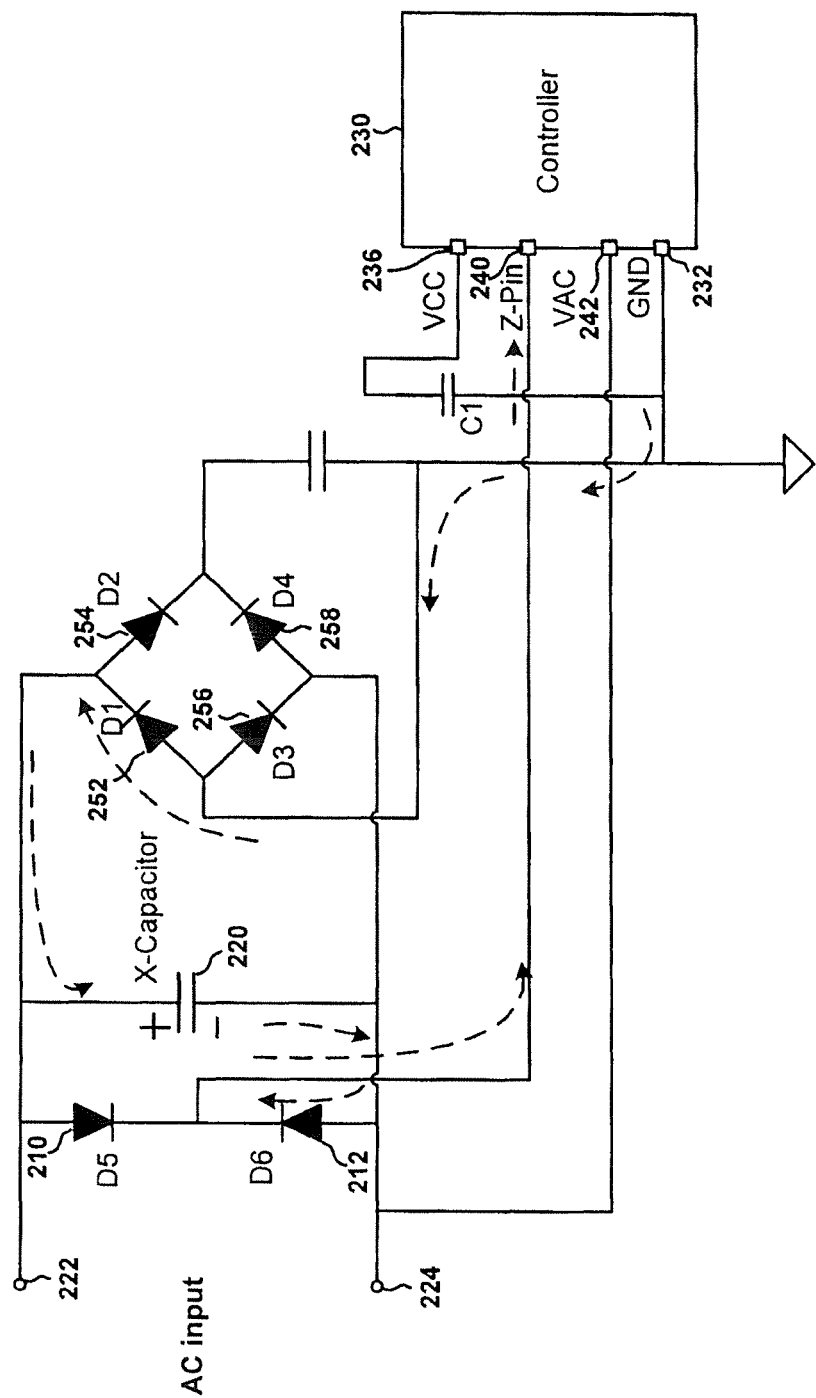

As shown in FIG. 3(B), the input terminals 222 and 224 are disconnected from the AC power supply during the negative half period of the AC input according to another embodiment. After the disconnect, the positive charges accumulated on the X-capacitor 220 are released by flowing from one terminal to another terminal. For example, the positive charges flow through the diode 212, the pin 240, the pin 232, and the diode 252.

FIG. 4 is a simplified diagram showing the switch-mode controller 230 in the switch-mode power converter system 200 according to an embodiment of the present invention. This diagram is merely an example, which should not unduly limit the scope of the claims. One of ordinary skill in the art would recognize many variations, alternatives, and modifications.

As shown in FIG. 4, the switch-mode controller 230 includes a detection component 410, transistors 420, 422, and 424, an under-voltage-lockout (UVLO) component 430, a resistor 440, a PWM signal generator 450, a logic control component 452, and a gate driver 454.

For example, the detection component 410 is configured to receive the input voltage from the terminal 242 and an output signal 432 of the UVLO component 430 and generate an output signal 412. In another example, if the input voltage at the terminal 242 is equal to or above a first predetermined threshold, the output signal 412 of the detection component 410 is at the logic low level. In yet another example, if the input voltage at the terminal 242 drops below the first predetermined threshold, the output signal 412 of the detection component 410 is at the logic high level, if the output signal 432 of the UVLO component 430 is also at the logic high level.

According to one embodiment, if the terminals 222 and 224 are connected to the AC input, during start-up of the switch-mode power converter system 200, the input voltage at the terminal 242 is equal to or above the first predetermined threshold. For example, if the input voltage received by the terminal 236 is below a second predetermined threshold, the output signal 432 of the UVLO component 430 is at the logical low level and the controller 230 is in the UVLO protection mode. In another example, the output signal 412 of the detection component 410 is at the logic low level, and the transistor 424 is turned off. In yet another example, the transistor 422 is turned off, and the transistor 420 is turned on. In yet another example, a current flows through the diode 210 or 212 and through the terminal 240 and the transistor 420, and charges the capacitor 260, thus raising the input voltage at the terminal 236.

According to another embodiment, if the input voltage at the terminal 242 remains equal to or above the first predetermined threshold, and the input voltage at the terminal 236 reaches or rises above the second predetermined threshold, the signal 432 changes to the logic high level, and the controller 230 is in the operation mode. For example, the output signal 412 of the detection component 410 remains at the logic low level, and the transistor 424 remains off. In another example, the transistor 422 is turned on, and the transistor 420 is turned off. In yet another example, the current can no longer flows through the diode 210 or 212 and through the terminal 240 and the transistor 420 to charge the capacitor 260. In yet another example, a small current flows through the diode 210 or 212 and through the terminal 240 and the resistor 440, where the resistor 440 has a large resistance. In yet another example, the input voltage to the terminal 236 is provided by the auxiliary winding 276 at every cycle of switching.

According to yet another embodiment, if the terminals 222 and 224 are disconnected from the AC input, the input voltage at the terminal 242 drops below the first predetermined threshold. For example, when the output signal 432 of the UVLO component 430 is at the logic high level, in response, the output signal 412 of the detection component 410 changes to the logic high level, and the controller 230 is in the discharging mode for the capacitor 220. In one embodiment, in the discharging mode for the capacitor 220, a drive signal 456 generated by the gate driver 454 remains at the logic low level. In another embodiment, the transistor 424 is turned on to discharge the capacitor 220 through the diode 210 or 212 and through the terminal 240, the transistor 424 and the terminal 232.

According to yet another embodiment, if the terminals 222 and 224 remain disconnected from the AC input and the input voltage at the terminal 242 remains below the first predetermined threshold, the output signal 432 of the UVLO component 430 changes to the logic low level. In response, for example, the output signal 412 of the detection component 410 changes to the logic low level and the transistor 424 is turned off.

As discussed above and further emphasized here, FIG. 4 is merely an example, which should not unduly limit the scope of the claims. One of ordinary skill in the art would recognize many variations, alternatives, and modifications. For example, the resistor 440 is replaced by a JFET. In one embodiment, the base of the JFET is biased to the ground, the drain of the JFET is directly connected to the terminal 240, and the source of the JFET is directly connected to the gate of the transistor 420.

FIG. 5 is a simplified diagram showing the switch-mode controller 230 in the switch-mode power converter system 200 according to another embodiment of the present invention. This diagram is merely an example, which should not unduly limit the scope of the claims. One of ordinary skill in the art would recognize many variations, alternatives, and modifications.

As shown in FIG. 5, the switch-mode controller 230 includes a detection component 510, transistors 520, 522, and 524, an under-voltage-lockout (UVLO) component 530, a resistor 540, a PWM signal generator 550, a logic control component 552, and a gate driver 554.

For example, the detection component 510 is configured to receive the input voltage from the terminal 242 and an output signal 532 of the UVLO component 530 and generate an output signal 512. In another example, if the input voltage at the terminal 242 is equal to or above a first predetermined threshold, the output signal 512 of the detection component 510 is at the logic low level. In yet another example, if the input voltage at the terminal 242 drops below the first predetermined threshold, the output signal 512 of the detection component 510 is at the logic high level, if the output signal 532 of the UVLO component 530 is also at the logic high level.

According to one embodiment, if the terminals 222 and 224 are connected to the AC input, during start-up of the switch-mode power converter system 200, the input voltage at the terminal 242 is equal to or above the first predetermined threshold. For example, if the input voltage received by the terminal 236 is below a second predetermined threshold, the output signal 532 of the UVLO component 530 is at the logical low level and the controller 230 is in the UVLO protection mode. In another example, the output signal 512 of the detection component 510 is at the logic low level, and the transistor 524 is turned off. In yet another example, the transistor 522 is turned off, and the transistor 520 is turned on. In yet another example, a current flows through the diode 210 or 212 and through the terminal 240 and the transistor 520, and charges the capacitor 260, thus raising the input voltage at the terminal 236.

According to another embodiment, if the input voltage at the terminal 242 remains equal to or above the first predetermined threshold, and the input voltage at the terminal 236 reaches or rises above the second predetermined threshold, the signal 532 changes to the logic high level, and the controller 230 is in the operation mode. For example, the output signal 512 of the detection component 510 remains at the logic low level, and the transistor 524 remains off. In another example, the transistor 522 is turned on, and the transistor 520 is turned off. In yet another example, the current can no longer flows through the diode 210 or 212 and through the terminal 240 and the transistor 520 to charge the capacitor 260. In yet another example, a small current flows through the diode 210 or 212 and through the terminal 240 and the resistor 540, where the resistor 540 has a large resistance. In yet another example, the input voltage to the terminal 236 is provided by the auxiliary winding 276 at every cycle of switching.

According to yet another embodiment, if the terminals 222 and 224 are disconnected from the AC input, the input voltage at the terminal 242 drops below the first predetermined threshold. For example, when the output signal 532 of the UVLO component 530 is at the logic high level, in response, the output signal 512 of the detection component 510 changes to the logic high level, and the controller 230 is in the discharging mode for the capacitor 220. In one embodiment, in the discharging mode for the capacitor 220, a drive signal 556 generated by the gate driver 554 remains at the logic low level. In another embodiment, the transistor 524 is turned on to discharge the capacitor 260 and the input voltage at the terminal 236 drops below the second predetermined threshold. For example, in response, the output signal 532 of the UVLO component 530 changes to the logical low level and the controller 230 changes into the UVLO protection mode. In another example, the transistor 522 is turned off, and the transistors 520 and 524 are on. In yet another example, a current flows through the diode 210 or 212 and through the terminal 240, the transistor 520, and the transistor 524 to discharge the capacitor 220.

According to yet another embodiment, if the terminals 222 and 224 remain disconnected from the AC input and the input voltage at the terminal 242 remains below the first predetermined threshold, the output signal 532 of the UVLO component 530 changes to the logic low level. In response, for example, the output signal 512 of the detection component 510 changes to the logic low level and the transistor 524 is turned off.

As discussed above and further emphasized here, FIG. 5 is merely an example, which should not unduly limit the scope of the claims. One of ordinary skill in the art would recognize many variations, alternatives, and modifications. For example, the resistor 540 is replaced by a JFET. In one embodiment, the base of the JFET is biased to the ground, the drain of the JFET is directly connected to the terminal 240, and the source of the JFET is directly connected to the gate of the transistor 520.

FIG. 6 is a simplified diagram showing the switch-mode power converter system 200 according to another embodiment of the present invention. This diagram is merely an example, which should not unduly limit the scope of the claims. One of ordinary skill in the art would recognize many variations, alternatives, and modifications.

In comparison with FIG. 2, the power converter system 200 as shown in FIG. 6 includes three additional components 610, 612, and 630. For example, the component 610 is coupled between the terminal 222 and the diode 210. In another example, the component 612 is coupled between the terminal 224 and the diode 212. In yet another example, the component 630 is coupled between a node 632 and the terminal 240. According to certain embodiments, each of the components 610, 612, and 630 includes a resistor and/or an inductor. According to some embodiments, the components 610, 612, and 630 are used to protect the diode 210, the diode 212, and the terminal 240 respectively.

According to another embodiment, as shown, for example, in FIG. 2, FIG. 4, FIG. 5, and/or FIG. 6, a power conversion system (e.g., 200) is described. The system (e.g., 200) includes a first capacitor (e.g., 220) including a first capacitor terminal and a second capacitor terminal, a second capacitor (e.g., 260) including a third capacitor terminal and a fourth capacitor terminal, and a plurality of diodes including a first diode (e.g., 252), a second diode (e.g., 254), a third diode (e.g., 256), and a fourth diode (e.g., 258). The first diode (e.g., 252) is coupled to the second diode (e.g., 254) at a first node, the second diode (e.g., 254) is coupled to the fourth diode (e.g., 258) at a second node, the fourth diode (e.g., 258) is coupled to the third diode (e.g., 256) at a third node, and the third diode (e.g., 256) is coupled to the first diode (e.g., 252) at a fourth node. Additionally, the system (e.g., 200) includes a fifth diode (e.g., 210) including a first anode and a first cathode and a sixth diode (e.g., 212) including a second anode and a second cathode. The first anode is connected to a first input terminal (e.g., 222), the second anode is connected to a second input terminal (e.g., 224), and the first cathode and the second cathode are connected to a fifth node. Moreover, the system (e.g., 200) includes a system controller (e.g., 230) including a first controller terminal (e.g., 240), a second controller terminal (e.g., 242), a third controller terminal (e.g., 232), a fourth controller terminal (e.g., 236), and a fifth controller terminal (e.g., 238). Also, the system (e.g., 200) includes a primary winding (e.g., 272) including a first winding terminal and a second winding terminal, a secondary winding (e.g., 274) coupled to the primary winding (e.g., 272), and an auxiliary winding (e.g., 276) coupled to the secondary winding (e.g., 274). Additionally, the system (e.g., 200) includes a switch (e.g., 280) including a first switch terminal and a second switch terminal. The first node is connected to the first input terminal, the second node is connected to the first winding terminal, the third node is connected to the second input terminal, the fourth node is biased to a predetermined voltage, and the fifth node is connected to the first controller terminal (e.g., 240). The second controller terminal (e.g., 242) is connected to the second input terminal, the third controller terminal (e.g., 232) is biased to the predetermined voltage, the fourth controller terminal (e.g., 236) is connected to the third capacitor terminal. The fourth capacitor terminal is biased to the predetermined voltage, the first capacitor terminal is connected to the first input terminal, and the second capacitor terminal is connected to the second input terminal. The first switch terminal is connected to the fifth controller terminal (e.g., 238), and the second switch terminal is connected to the second winding terminal. The first input terminal and the second input terminal are configured to receive an input voltage, and the secondary winding is configured to generate an output voltage based on at least information associated with the input voltage.

For example, the first anode is indirectly connected to the first input terminal (e.g., 222) through a first component (e.g., 610), and the second anode is indirectly connected to the second input terminal (e.g., 224) through a second component (e.g., 612). In another example, the first component (e.g., 610) includes at least one selected from a group consisting of a resistor and an inductor. In yet another example, the second component (e.g., 612) includes at least one selected from a group consisting of a resistor and an inductor. In yet another example, the fifth node (e.g., 632) is indirectly connected to the first controller terminal (e.g., 240) through a component (e.g., 630), the component (e.g., 630) including at least one selected from a group consisting of a resistor and an inductor.

In yet another example, the system controller (e.g., 230) includes a detection component (e.g., 410 or 510), a transistor (e.g., 424 or 524), and an under-voltage-lockout component (e.g., 430 or 530), the detection component (e.g., 410 or 510) being coupled to the second controller terminal (e.g., 242), the under-voltage-lockout component (e.g., 430 or 530), and the transistor (e.g., 424 or 524). In yet another example, the detection component (e.g., 410 or 510) is configured to receive a first input voltage from the second input terminal (e.g., 224) through the second controller terminal (e.g., 242), receive a first signal from the under-voltage-lockout component (e.g., 430 or 530), generate a second signal based on at least information associated with the first input voltage and the first signal, and send the second signal to the first transistor (e.g., 424 or 524). In yet another example, the second signal is at a logic high level if the first input voltage is lower than a first threshold voltage in magnitude and the first signal is at the logic high level. In yet another example, the transistor (e.g., 424 or 524) includes a first transistor terminal, a second transistor terminal, and a third transistor terminal. The first transistor terminal is configured to receive the second signal from the detection component (e.g., 410 or 510), and the second transistor terminal is connected to the third controller terminal (e.g., 232). In yet another example, the third transistor terminal is connected to the first controller terminal (e.g., 240). In yet another example, the third terminal is connected to the fourth controller terminal (e.g., 236). In yet another example, the first transistor terminal is a gate terminal, the second transistor terminal is a source terminal, and the third transistor terminal is a drain terminal. In yet another example, the under-voltage-lockout component (e.g., 430 or 530) is configured to receive a second input voltage from the third capacitor terminal through the fourth controller terminal (e.g., 236) and generate the first signal based on at least information associated with the second input voltage. In yet another example, the second signal is at the logic high level if the second input voltage is higher than a second threshold voltage in magnitude.

According to yet another embodiment, as shown, for example, in FIG. 2, FIG. 4, FIG. 5, and/or FIG. 6, a system for discharging a capacitor of a power conversion system (e.g., 200) is described. The system includes a first capacitor (e.g., 220) including a first capacitor terminal and a second capacitor terminal. The first capacitor terminal is connected to a first input terminal (e.g., 222), and the second capacitor terminal is connected to a second input terminal (e.g., 224). Additionally, the system includes a second capacitor (e.g., 260) including a third capacitor terminal and a fourth capacitor terminal, the fourth capacitor terminal being biased to a predetermined voltage. Moreover, the system includes a first diode (e.g., 210) including a first anode and a first cathode, and a second diode (e.g., 212) including a second anode and a second cathode. The first anode is connected to the first input terminal (e.g., 222), and the second anode is connected to the second input terminal (e.g., 224). Also, the system includes a system controller (e.g., 230) including a first controller terminal (e.g., 240), a second controller terminal (e.g., 242), a third controller terminal (e.g., 232), and a fourth controller terminal (e.g., 236). The first controller terminal (e.g., 240) is connected to the first cathode and the second cathode, the second controller terminal (e.g., 242) is connected to the second input terminal, the third controller terminal (e.g., 232) is biased to the predetermined voltage, and the fourth controller terminal (e.g., 236) is connected to the third capacitor terminal. The system controller (e.g., 230) further includes a detection component (e.g., 410 or 510), a transistor (e.g., 424 or 524), and an under-voltage-lockout component (e.g., 430 or 530). The detection component (e.g., 410 or 510) is configured to receive a first input voltage from the second input terminal (e.g., 224) through the second controller terminal (e.g., 242), receive a first signal from the under-voltage-lockout component (e.g., 430 or 530), generate a second signal based on at least information associated with the first input voltage and the first signal, and send the second signal to the first transistor (e.g., 424 or 524). The second signal is at a logic high level if the first input voltage is lower than a first threshold voltage in magnitude and the first signal is at the logic high level. The transistor (e.g., 424 or 524) includes a first transistor terminal, a second transistor terminal, and a third transistor terminal. The first transistor terminal is configured to receive the second signal from the detection component (e.g., 410 or 510), and the second transistor terminal is connected to the third controller terminal (e.g., 232). The under-voltage-lockout component (e.g., 430 or 530) is configured to receive a second input voltage from the third capacitor terminal through the fourth controller terminal (e.g., 236) and generate the first signal based on at least information associated with the second input voltage. The second signal is at the logic high level if the second input voltage is higher than a second threshold voltage in magnitude.

For example, the third transistor terminal is connected to the first controller terminal (e.g., 240). In another example, the third transistor terminal is connected to the fourth controller terminal (e.g., 236). In yet another example, the first transistor terminal is a gate terminal, the second transistor terminal is a source terminal, and the third transistor terminal is a drain terminal. In yet another example, the first anode is indirectly connected to the first input terminal (e.g., 222) through a first component (e.g., 610), and the second anode is indirectly connected to the second input terminal (e.g., 224) through a second component (e.g., 612). In yet another example, the first component (e.g., 610) includes at least one selected from a group consisting of a resistor and an inductor. In yet another example, the second component (e.g., 612) includes at least one selected from a group consisting of a resistor and an inductor. In yet another example, the first controller terminal (e.g., 240) is indirectly connected to the first cathode and the second cathode through a component (e.g., 630), and the component (e.g., 630) includes at least one selected from a group consisting of a resistor and an inductor. In yet another example, the predetermined voltage is the ground voltage.

According to yet another embodiment, as shown, for example, in FIG. 2, FIG. 4, FIG. 5, and/or FIG. 6, a system (e.g., 230) for discharging a capacitor of a power conversion system (e.g., 200) is described. The system (e.g., 230) includes a first controller terminal (e.g., 240). The first controller terminal (e.g., 240) is configured to receive a discharging current from a first diode or a second diode. The first diode and the second diode are coupled to a first capacitor, and the first capacitor is configured to be charged by a first input terminal and a second input terminal. Additionally, the system (e.g., 230) includes a second controller terminal (e.g., 242) configured to receive a first input voltage from the second input terminal (e.g., 224), a third controller terminal (e.g., 232) biased to a predetermined voltage, and a fourth controller terminal (e.g., 236) configured to receive a second input voltage from a second capacitor (e.g., 260). Moreover, the system (e.g., 230) includes a detection component (e.g., 410 or 510). The detection component (e.g., 410 or 510) is configured to receive the first input voltage from the second input terminal (e.g., 224) through the second controller terminal (e.g., 242), receive a first signal from an under-voltage-lockout component (e.g., 430 or 530), generate a second signal based on at least information associated with the first input voltage and the first signal, and send the second signal to a transistor (e.g., 424 or 524). The second signal is at a logic high level if the first input voltage is lower than a first threshold voltage in magnitude and the first signal is at the logic high level. Also, the system (e.g., 230) includes the transistor (e.g., 424) including a first transistor terminal, a second transistor terminal, and a third transistor terminal. The first transistor terminal is configured to receive the second signal from the detection component (e.g., 410 or 510), and the second transistor terminal is connected to the third controller terminal (e.g., 232). Additionally, the system (e.g., 230) includes the under-voltage-lockout component (e.g., 430 or 530). The under-voltage-lockout component (e.g., 430 or 530) is configured to receive the second input voltage from the second capacitor (e.g., 260) through the fourth controller terminal (e.g., 236) and generate the first signal based on at least information associated with the second input voltage. The second signal is at the logic high level if the second input voltage is higher than a second threshold voltage in magnitude.

For example, the third transistor terminal is connected to the first controller terminal (e.g., 240). In another example, the third transistor terminal is connected to the fourth controller terminal (e.g., 236). In yet another example, the first transistor terminal is a gate terminal, the second transistor terminal is a source terminal, and the third transistor terminal is a drain terminal. In yet another example, the first diode (e.g., 210) is connected to the first input terminal (e.g., 222), and the second diode (e.g., 212) is connected to the second input terminal (e.g., 224). In yet another example, the first diode is indirectly connected to the first input terminal (e.g., 222) through a first component (e.g., 610), and the second diode is indirectly connected to the second input terminal (e.g., 224) through a second component (e.g., 612). In yet another example, the first controller terminal (e.g., 240) is configured to receive the discharging current from a first diode or a second diode through a component (e.g., 630), and the component (e.g., 630) includes at least one selected from a group consisting of a resistor and an inductor. In yet another example, the predetermined voltage is the ground voltage.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A power conversion system, the system comprising:
a first capacitor including a first capacitor terminal and a second capacitor terminal;

a second capacitor including a third capacitor terminal and a fourth capacitor terminal;
a plurality of diodes including a first diode, a second diode, a third diode, and a fourth diode, the first diode being coupled to the second diode at a first node, the second diode being coupled to the fourth diode at a second node, the fourth diode being coupled to the third diode at a third node, the third diode being coupled to the first diode at a fourth node;
a fifth diode including a first anode and a first cathode, the first anode being connected to a first input terminal;
a sixth diode including a second anode and a second cathode, the second anode being connected to a second input terminal, the first cathode and the second cathode being connected to a fifth node;
a system controller including a first controller terminal, a second controller terminal, a third controller terminal, a fourth controller terminal, and a fifth controller terminal;
a primary winding including a first winding terminal and a second winding terminal;
a secondary winding coupled to the primary winding;
an auxiliary winding coupled to the secondary winding; and
a switch including a first switch terminal and a second switch terminal;
wherein:
the first node is connected to the first input terminal;
the second node is connected to the first winding terminal;
the third node is connected to the second input terminal;
the fourth node is biased to a predetermined voltage;
the fifth node is connected to the first controller terminal;
the second controller terminal is directly connected to the second input terminal;
the third controller terminal is biased to the predetermined voltage;
the fourth controller terminal is connected to the third capacitor terminal;
the fourth capacitor terminal is biased to the predetermined voltage;
the first capacitor terminal is connected to the first input terminal;
the second capacitor terminal is connected to the second input terminal;
the first switch terminal is connected to the fifth controller terminal; and
the second switch terminal is connected to the second winding terminal;
wherein:
the first input terminal and the second input terminal are configured to receive an input voltage; and
the secondary winding is configured to generate an output voltage based on at least information associated with the input voltage.

2. The system of claim 1 wherein:
the first anode is indirectly connected to the first input terminal through a first component; and
the second anode is indirectly connected to the second input terminal through a second component.

3. The system of claim 2 wherein the first component includes at least one selected from a group consisting of a resistor and an inductor.

4. The system of claim 2 wherein the second component includes at least one selected from a group consisting of a resistor and an inductor.

5. The system of claim 1 wherein the fifth node is indirectly connected to the first controller terminal through a component, the component including at least one selected from a group consisting of a resistor and an inductor.

6. The system of claim 1 wherein the system controller includes a detection component, a transistor, and an under-voltage-lockout component, the detection component being coupled to the second controller terminal, the under-voltage-lockout component, and the transistor.

7. A power conversion system, the system comprising:
a first capacitor including a first capacitor terminal and a second capacitor terminal;
a second capacitor including a third capacitor terminal and a fourth capacitor terminal;
a plurality of diodes including a first diode, a second diode, a third diode, and a fourth diode, the first diode being coupled to the second diode at a first node, the second diode being coupled to the fourth diode at a second node, the fourth diode being coupled to the third diode at a third node, the third diode being coupled to the first diode at a fourth node;
a fifth diode including a first anode and a first cathode, the first anode being connected to a first input terminal;
a sixth diode including a second anode and a second cathode, the second anode being connected to a second input terminal, the first cathode and the second cathode being connected to a fifth node;
a system controller including a first controller terminal, a second controller terminal, a third controller terminal, a fourth controller terminal, and a fifth controller terminal;
a primary winding including a first winding terminal and a second winding terminal;
a secondary winding coupled to the primary winding;
an auxiliary winding coupled to the secondary winding; and
a switch including a first switch terminal and a second switch terminal;
wherein:
the first node is connected to the first input terminal;
the second node is connected to the first winding terminal;
the third node is connected to the second input terminal;
the fourth node is biased to a predetermined voltage;
the fifth node is connected to the first controller terminal;
the second controller terminal is connected to the second input terminal;
the third controller terminal is biased to the predetermined voltage;
the fourth controller terminal is connected to the third capacitor terminal;
the fourth capacitor terminal is biased to the predetermined voltage;
the first capacitor terminal is connected to the first input terminal;
the second capacitor terminal is connected to the second input terminal;
the first switch terminal is connected to the fifth controller terminal; and
the second switch terminal is connected to the second winding terminal;
wherein:

the first input terminal and the second input terminal are configured to receive an input voltage; and the secondary winding is configured to generate an output voltage based on at least information associated with the input voltage;

wherein the system controller includes a detection component, a transistor, and an under-voltage-lockout component, the detection component being coupled to the second controller terminal, the under-voltage-lockout component, and the transistor;

wherein the detection component is configured to receive a first input voltage from the second input terminal through the second controller terminal, receive a first signal from the under-voltage-lockout component, generate a second signal based on at least information associated with the first input voltage and the first signal, and send the second signal to the first transistor.

8. The system of claim 7 wherein the second signal is at a logic high level if the first input voltage is lower than a first threshold voltage in magnitude and the first signal is at the logic high level.

9. A power conversion system, the system comprising:
a first capacitor including a first capacitor terminal and a second capacitor terminal;
a second capacitor including a third capacitor terminal and a fourth capacitor terminal;
a plurality of diodes including a first diode, a second diode, a third diode, and a fourth diode, the first diode being coupled to the second diode at a first node, the second diode being coupled to the fourth diode at a second node, the fourth diode being coupled to the third diode at a third node, the third diode being coupled to the first diode at a fourth node;
a fifth diode including a first anode and a first cathode, the first anode being connected to a first input terminal;
a sixth diode including a second anode and a second cathode, the second anode being connected to a second input terminal, the first cathode and the second cathode being connected to a fifth node;
a system controller including a first controller terminal, a second controller terminal, a third controller terminal, a fourth controller terminal, and a fifth controller terminal;
a primary winding including a first winding terminal and a second winding terminal;
a secondary winding coupled to the primary winding;
an auxiliary winding coupled to the secondary winding; and
a switch including a first switch terminal and a second switch terminal;
wherein:
the first node is connected to the first input terminal;
the second node is connected to the first winding terminal;
the third node is connected to the second input terminal;
the fourth node is biased to a predetermined voltage;
the fifth node is connected to the first controller terminal;
the second controller terminal is connected to the second input terminal;
the third controller terminal is biased to the predetermined voltage;
the fourth controller terminal is connected to the third capacitor terminal;
the fourth capacitor terminal is biased to the predetermined voltage;
the first capacitor terminal is connected to the first input terminal;
the second capacitor terminal is connected to the second input terminal;
the first switch terminal is connected to the fifth controller terminal; and
the second switch terminal is connected to the second winding terminal;
wherein:
the first input terminal and the second input terminal are configured to receive an input voltage; and
the secondary winding is configured to generate an output voltage based on at least information associated with the input voltage;
wherein the system controller includes a detection component, a transistor, and an under-voltage-lockout component, the detection component being coupled to the second controller terminal, the under-voltage-lockout component, and the transistor;
wherein the transistor includes a first transistor terminal, a second transistor terminal, and a third transistor terminal, the first transistor terminal being configured to receive the second signal from the detection component, the second transistor terminal being connected to the third controller terminal.

10. The system of claim 9 wherein the third transistor terminal is connected to the first controller terminal.

11. The system of claim 9 wherein the third transistor terminal is connected to the fourth controller terminal.

12. The system of claim 9 wherein the first transistor terminal is a gate terminal, the second transistor terminal is a source terminal, and the third transistor terminal is a drain terminal.

13. The system of claim 10 wherein the under-voltage-lockout component is configured to receive a second input voltage from the third capacitor terminal through the fourth controller terminal and generate the first signal based on at least information associated with the second input voltage.

14. The system of claim 13 wherein the second signal is at the logic high level if the second input voltage is higher than a second threshold voltage in magnitude.

* * * * *